(12) United States Patent
Noda et al.

(10) Patent No.: US 8,325,257 B2
(45) Date of Patent: Dec. 4, 2012

(54) SOLID-STATE IMAGE PICKUP DEVICE AND METHOD FOR DRIVING THE SAME

(75) Inventors: Tomoyuki Noda, Kawasaki (JP); Tetsuya Itano, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 12/944,646

(22) Filed: Nov. 11, 2010

(65) Prior Publication Data

US 2011/0141332 A1    Jun. 16, 2011

(30) Foreign Application Priority Data

Dec. 11, 2009 (JP) ................................. 2009-282296

(51) Int. Cl.
*H04N 3/14* (2006.01)
*H04N 5/228* (2006.01)

(52) U.S. Cl. ..................................... 348/300; 348/222.1

(58) Field of Classification Search .................. 348/300, 348/294, 312, 222.1, 220.1; 250/208.1; 257/291
See application file for complete search history.

(56) References Cited

U.S. PATENT DOCUMENTS

| | | | | |
|---|---|---|---|---|
| 6,128,039 A | * | 10/2000 | Chen et al. | 348/294 |
| 6,747,264 B2 | * | 6/2004 | Miida | 348/300 |
| 6,897,429 B1 | * | 5/2005 | Turner et al. | 250/208.1 |
| 7,304,674 B2 | * | 12/2007 | Mentzer et al. | 348/300 |
| 7,460,164 B2 | * | 12/2008 | Hyama et al. | 348/300 |
| 8,023,027 B2 | * | 9/2011 | Yamamoto | 348/222.1 |
| 2005/0168603 A1 | * | 8/2005 | Hiyama et al. | 348/294 |
| 2008/0273093 A1 | * | 11/2008 | Okita et al. | 348/220.1 |
| 2009/0166513 A1 | | 7/2009 | Abe | |
| 2009/0295969 A1 | * | 12/2009 | Kondo | 348/308 |

FOREIGN PATENT DOCUMENTS

CN    101299797 A    11/2008
JP    2005-217771 A    8/2005

* cited by examiner

*Primary Examiner* — Nhan T Tran
(74) *Attorney, Agent, or Firm* — Canon U.S.A., Inc. IP Division

(57) ABSTRACT

A solid-state image pickup device includes a plurality of common output lines receiving signals from a plurality of pixels, a plurality of column amplifier units amplifying the signals, a plurality of storage capacitors storing the amplified signals, a first transistor controlling electrical conduction between the output node of the column amplifier unit and the input node of a storage capacitor, a switch switching current for operating the column amplifier unit between a first current and a second current smaller than the first current, and a controller inhibiting, while the second current is flowing through the column amplifier unit, a potential at the output node of the column amplifier unit from approaching an off-state voltage supplied to a gate of the first transistor in an OFF state of the first transistor.

10 Claims, 7 Drawing Sheets

SOLID-STATE IMAGE PICKUP DEVICE AND METHOD FOR DRIVING THE SAME

BACKGROUND OF THE INVENTION

1. Field of the Invention

The present invention relates to solid-state image pickup devices for use in apparatuses, such as digital still cameras and digital camcorders.

2. Description of the Related Art

Recently, pixel-amplification-type solid-state image pickup devices, a type of solid-state image pickup devices, have been widely used in digital still cameras and digital camcorders because of their capability of achieving high image quality and high resolution. The more the number of pixels increases, the further each of the pixels is scaled down. Additionally, performance demanded for the solid-state image pickup devices is also increasing. Particularly, a decrease in power consumption is strictly demanded because it affects continuous use time of batteries. Japanese Patent Laid-Open No. 2005-217771 discloses a solid-state image pickup device having a power saving mode serving as a method for decreasing power consumption thereof.

The solid-state image pickup device according to Japanese Patent Laid-Open No. 2005-217771 includes a column amplifier unit for each pixel column. A storage capacitor is arranged at an output node of the column amplifier unit through a transfer metal oxide semiconductor (MOS) transistor. To decrease the power consumption, the solid-state image pickup device shuts off or decreases current flowing through the column amplifier unit during a non-operational period (hereinafter, referred to as an OFF period). As described above, the further the pixels are scaled down, the further transistors constituting the solid-state image pickup device and, thus, the transfer MOS transistor, are scaled down. When gate potential is equal to source potential, subthreshold current may unfortunately flow through the MOS transistor having a small gate length.

The method disclosed in Japanese Patent Laid-Open No. 2005-217771 may require further examination because off-state current flows when the transistor between the column amplifier unit and the storage capacitor storing a signal fed from the column amplifier unit is small. A mechanism thereof will be described in detail below.

In the method disclosed in Japanese Patent Laid-Open No. 2005-217771, potential at the output node of the column amplifier unit is equal to the highest potential (e.g., VDD) or the lowest potential (e.g., ground potential) while the current to the column amplifier unit is shut off.

When a transfer switch includes a P-channel MOS (PMOS) transistor, the voltage VDD is supplied to a gate of PMOS transistor during an OFF period thereof. If the potential at the output node of the column amplifier unit is equal to the voltage VDD in the power saving mode, source potential of the PMOS transistor is also equal to the voltage VDD and, thus, subthreshold current flows therethrough. When the transfer switch includes an N-channel MOS (NMOS) transistor, the ground voltage is supplied to a gate of the NMOS transistor during an OFF period. If the potential at the output node of the column amplifier unit is equal to the ground voltage in the power saving mode, source potential of the NMOS transistor is also equal to the ground potential and, thus, subthreshold current flows therethrough.

Since the subthreshold current causes the storage capacitor to release electrical charge stored therein and attenuates the stored signal, preferable image quality may be disadvantageously unavailable.

SUMMARY OF THE INVENTION

According to an aspect of the present invention, a solid-state image pickup device includes: a plurality of common output lines arranged to receive signals output from a plurality of pixels; a plurality of column amplifier units provided for the respective common output lines and arranged to amplify the signals; a plurality of storage capacitors arranged to store the amplified signals; a first transistor, between an output node of the column amplifier unit and an input node of a storage capacitor, arranged to control electrical conduction between the output node and the input node; a switch arranged to switch current for operating the column amplifier unit between a first current and a second current smaller than the first current; and a controller arranged to inhibit, while the second current is flowing through the column amplifier unit, a potential at the output node from approaching an off-state voltage supplied to a gate of the first transistor in an OFF state of the first transistor.

Further features of the present invention will become apparent from the following description of exemplary embodiments with reference to the attached drawings.

DESCRIPTION OF THE EMBODIMENTS

First Exemplary Embodiment

Figure 1:
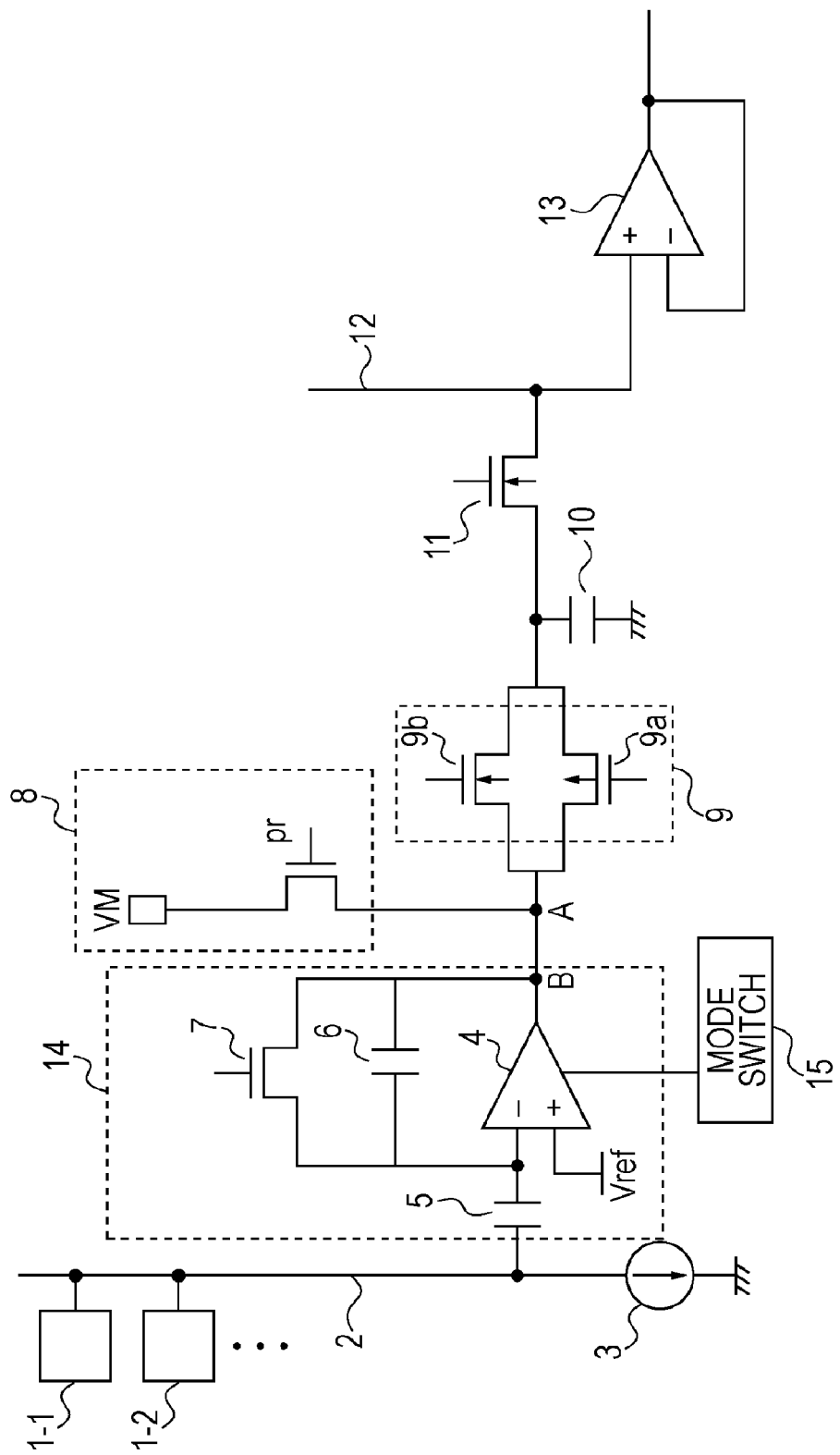
FIG. 1 is a diagram illustrating an equivalent circuit of a solid-state image pickup device according to a first exemplary embodiment of the present invention.

FIG. 1 is a diagram illustrating a circuit configuration of a solid-state image pickup device according to a first exemplary embodiment of the present invention. Pixels are arranged in a two-dimensional array. For simplification of the drawing, FIG. 1 illustrates an equivalent circuit of one pixel column of the pixel array. Each pixel column may include at least one pixel.

The solid-state image pickup device according to the first exemplary embodiment has a switch capable of switching an operation mode between a normal operation mode and a power saving mode. In the power saving mode, current or voltage supplied to a column amplifier unit is shut off or decreased compared with the normal operation mode during an OFF period of the column amplifier unit. The power saving mode of the column amplifier unit is executed, for example, during a horizontal transfer period.

FIG. 1 illustrates pixels 1-1 and 1-2, a first common output line 2, and a current source 3.

Signals are output to the first common output line 2 from a plurality of pixels. For example, signals are output to the first common output line 2 from pixels included in one pixel column. The first common output line 2 can be also referred to as a vertical output line. The current source 3 allows an amplifying transistor included in the pixel to operate as a source follower.

An operational amplifier 4, a clamping capacitor 5, a feedback capacitor 6, and a clamping switch 7 constitute a column amplifier unit 14. The column amplifier unit 14 amplifies a signal output to the first common output line 2. The signal from the first common output line 2 is input to an inverting input node of the operational amplifier 4 through the clamping capacitor 5, whereas a reference voltage (Vref) is input to a non-inverting input node thereof. The solid-state image pickup device includes more than one column amplifier unit 14. Although the column amplifier unit 14 is provided for each pixel column, the column amplifier unit 14 may be provided for a plurality of pixel columns or more than one column amplifier unit 14 may be provided for one pixel column. Gain of the column amplifier unit 14 can change depending on a ratio of capacitance of the clamping capacitor 5 to that of the feedback capacitor 6.

A voltage supply unit 8 can fix potential at an output node A of the column amplifier unit 14 to a predetermined level in the power saving mode. The voltage supply unit 8 functions as a controller that controls the potential at the output node A of the column amplifier unit 14 in the power saving mode. More specifically, during an OFF period of a transistor constituting a first switch 9 to be described later, the voltage supply unit 8 has a function for inhibiting the potential at the output node A of the column amplifier unit 14 from approaching an off-state voltage supplied to a gate of the transistor.

The voltage supply unit 8 includes a transistor. One of a source and a drain of the transistor is connected to the output node A of the column amplifier unit 14, whereas the other one of the source and the drain thereof is supplied with a voltage VM different from the off-state voltage supplied to a gate thereof in the OFF state of the transistor. The voltage VM is smaller than an absolute value of the voltage supplied to the gate to turn off a PMOS transistor.

The first switch 9 arranged between an input node of a storage capacitor 10 and the output node of the column amplifier unit 14 is constituted by a CMOS switch including a PMOS transistor and an NMOS transistor connected in parallel. Pulses having opposite phases are supplied to gates of the PMOS and NMOS transistors. The first switch 9 controls electrical conduction between the output node of the column amplifier unit 14 and the input node of the storage capacitor 10.

The storage capacitor 10 stores the output signal of the column amplifier unit 14 for a predetermined period. The solid-state image pickup device may further include a capacitor for storing an offset of the column amplifier unit 14 and a capacitor for storing a signal of a following readout-target pixel row during a horizontal transfer period.

A second switch 11 is arranged between the storage capacitor 10 and a second common output line 12. The second common output line 12 can be also referred to as a horizontal output line. The second switch 11 can control electrical conduction between the storage capacitor 10 and the second common output line 12. Signals are read out to the second common output line 12 by sequentially turning on the second switch 11 for each pixel column or for each group of pixel columns.

An output amplifier 13 amplifies or buffers the signal output to the second common output line 12. The output amplifier 12 is provided as needed.

A mode switch 15 switches current or voltage supplied to operate the column amplifier unit 14 in accordance with the normal operation mode and the power saving mode. More specifically, the mode switch 15 switches the current for operating the column amplifier unit 14 between a first current and a second current smaller than the first current. A period of the first current corresponds to the normal operation mode, whereas a period of the second current corresponds to the power saving mode.

Figure 2:
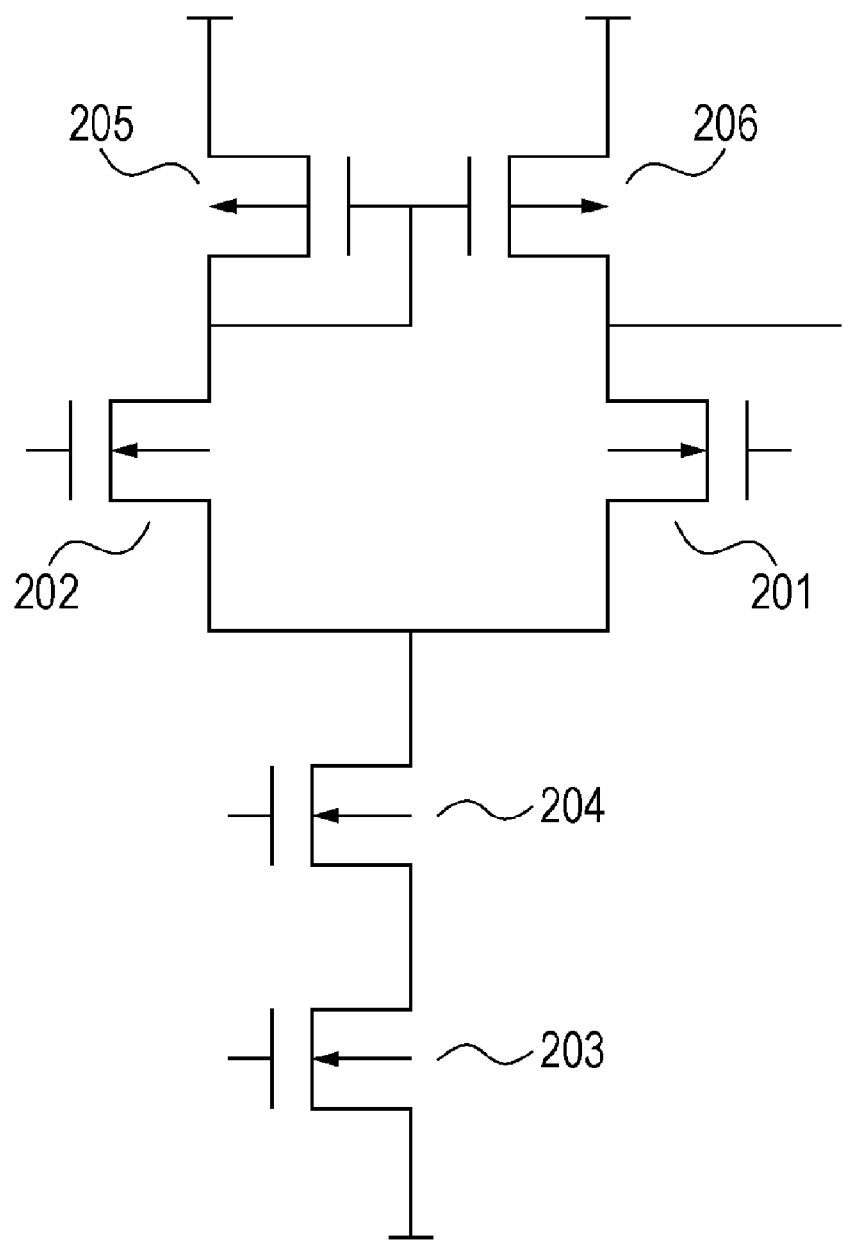
FIG. 2 is a circuit diagram illustrating an example of an operational amplifier constituting a column amplifier unit.

FIG. 2 is a diagram illustrating an example of an equivalent circuit of the operational amplifier 4 illustrated in FIG. 1.

A first input transistor 201 has a first conductivity type. Herein, an NMOS transistor serves as the first input transistor 201. The first input transistor 201 corresponds to the inverting input node of the operational amplifier 4. A signal is input to a gate of the first input transistor 201 from the first common output line 2. Although the signal is input through the clamping capacitor 5 in the first exemplary embodiment, the signal may be directly input to the first input transistor 201. A second input transistor 202 has the first conductivity type and corresponds to the non-inverting input node of the operational amplifier 4. The reference voltage Vref is supplied to the second input transistor 202.

A load transistor 203 is commonly connected to sources of the first and second input transistors 201 and 202, respectively. The load transistor 203 supplies current (i.e., bias current) for operating the operational amplifier 4.

A mode switching transistor 204 shuts off or decreases the bias current supplied to the operational amplifier 4 in accordance with a pulse supplied to a gate thereof from the mode switch 15. The mode switching transistor 204 can be arranged between the load transistor 203 and the first and second input transistors 201 and 202, respectively, in series, for example.

Transistors 205 and 206 on the drain side of the first and second input transistors 201 and 202, respectively, have a second conductivity type and constitute a current mirror configuration. PMOS transistors can serve as the transistors 205 and 206. Sources of the transistors 205 and 206 are supplied with a power supply voltage VDD.

An operation of the operational amplifier 4 in the power saving mode will now be described. If the mode switching transistor 204 is turned off or nearly turned off, the voltage at the output node of the operational amplifier 4 becomes equal to or approaches the power supply voltage VDD. For ease of explanation, a mechanism of turning off the mode switching transistor 204 will be described.

In response to turning off of the mode switching transistor 204, current supplied by the load transistor 203 is shut off. In response to shutoff of the current, current flowing through the first and second input transistors 201 and 202, respectively, are also shut off. A potential at a connection node (i.e., the output node of the operational amplifier 4) between the first input transistor 201 and the transistor 206 approaches the power supply voltage VDD because an influence of voltage drop decreases. The potential at the output node of the operational amplifier 4 ultimately becomes equal to the power supply voltage VDD. When the mode switching transistor 204 is nearly turned off, the potential at the output node of the operational amplifier 4 also approaches the power supply voltage VDD although an amount of the change is different.

Figure 3:
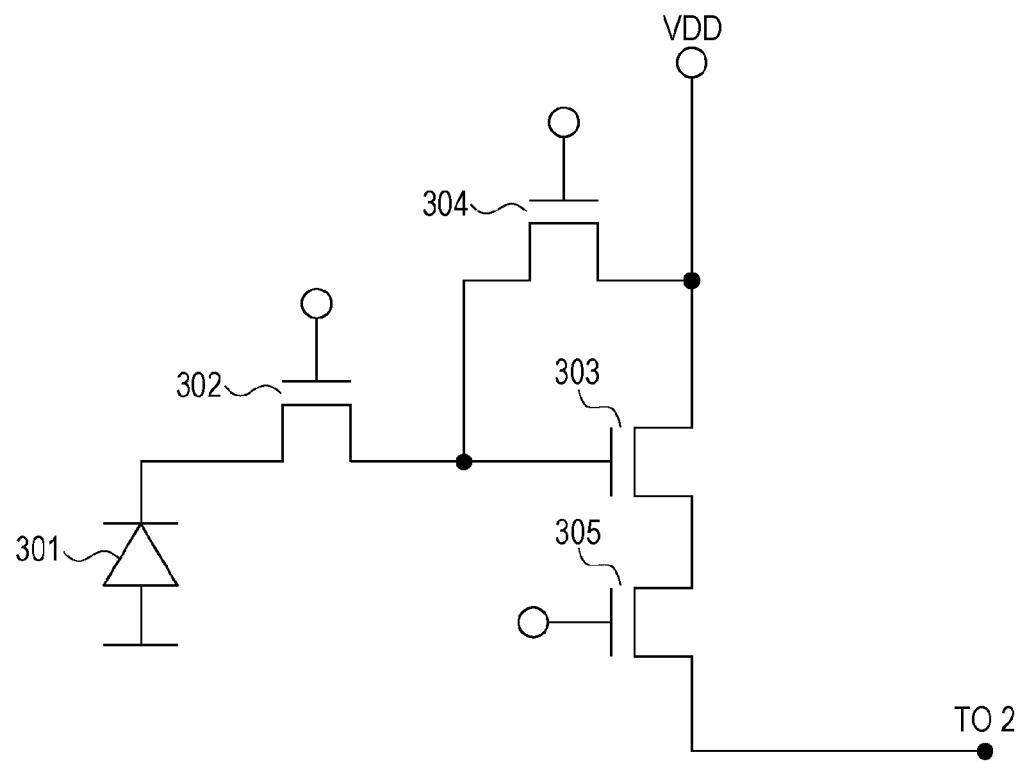
FIG. 3 is a diagram illustrating an example of an equivalent circuit of a pixel.

FIG. 3 illustrates an example circuit of the pixel illustrated in FIG. 1.

A photodiode 301 functions as a photoelectric conversion element. An amplifying transistor 303 amplifies a signal generated by the photoelectric conversion element 301 and outputs the amplified signal to the first common output line 2. A transfer transistor 302 transfers charge generated by the photoelectric conversion element 301 to a gate of the amplifying transistor 303. A reset transistor 304 resets the gate of the amplifying transistor 304. A select transistor 305 selects each pixel or a plurality of pixels.

The amplifying transistor 303 and the reset transistor 304 may be shared among a plurality of pixels. The select transistor 305 may be omitted and the reset transistor 304 may switch gate potential of the amplifying transistor 303 to select the pixel.

Figure 4:
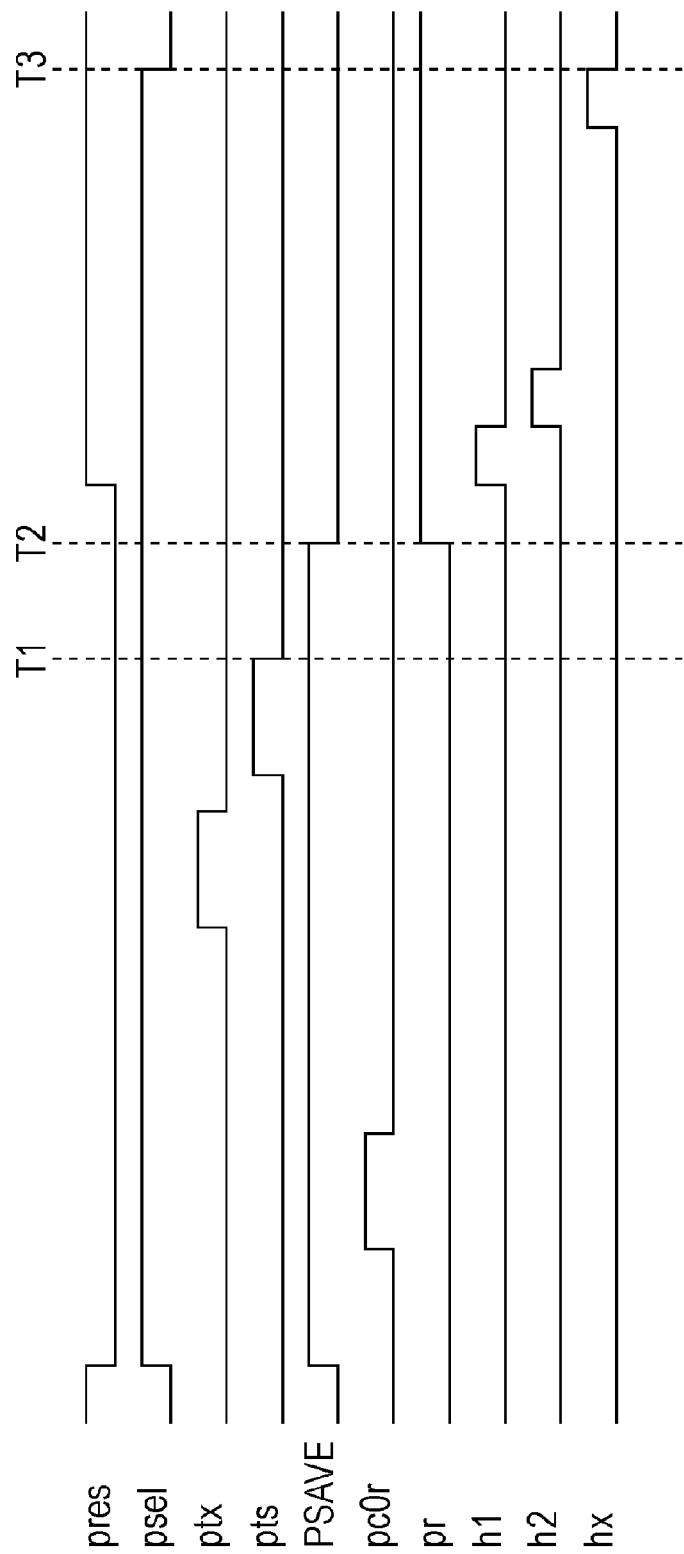
FIG. 4 is a timing chart for driving the solid-state image pickup device according to the first exemplary embodiment of the present invention.

FIG. 4 is a timing chart for driving the solid-state image pickup device according to the first exemplary embodiment. An operation of the voltage supply unit 8 in the power saving mode will be described with reference to FIG. 4.

A pulse "pres" is supplied to a gate of the reset transistor 304, whereas a pulse "psel" is supplied to a gate of the select transistor 305. Additionally, pulses "ptx" and "pts" are supplied to gates of the transfer transistor 302 and the PMOS transistor 9a constituting the first switch 9, respectively. A pulse opposite to the pulse "pts" supplied to the gate of the PMOS transistor 9a is supplied to a gate of the corresponding NMOS transistor 9b. A pulse "PSAVE" is supplied to the mode switching transistor 204. A pulse "pc0r" is supplied to a gate of the clamping switch 7, whereas a pulse "pr" is supplied to a gate of the transistor included in the voltage supply unit 8. Pulses "h1", "h2", and "hx" are supplied to the second switch 11 from a horizontal scanning circuit, where a subscript corresponds to each pixel column.

A high level of the pulse "pts" turns on the PMOS transistor 9a, whereas a low level thereof turns off the PMOS transistor 9a. Since the opposite pulse of the pulse "pts" is supplied to the corresponding NMOS transistor 9b, the PMOS transistor 9a and the NMOS transistor 9b are turned on and off substantially at the same time. Regarding the other pulses, a high level corresponds to an active state.

In advance of the operation illustrated in FIG. 4, signal charge is accumulated in the photoelectric conversion element 301 after a predetermined exposure time.

In a first stage, the pulse "pres" shifts into the low level from the high level to terminate resetting of the gate of the amplifying transistor 303. At the same time, a row selecting pulse "psel" shifts into the high level from the low level to turn on the select transistor 305 and to cause a dark signal to be output to the first common output line 2.

In a second stage, the pulse "pc0r" shifts into the high level from the low level to cause the operational amplifier 4 to operate as a voltage follower. The operational amplifier 4 clamps the voltage level with reference to the dark signal output to the first common output line 2.

In a third stage, the pulse "ptx" shifts into the high level from the low level to cause the charge accumulated in the photoelectric conversion element 301 to be transferred to the gate of the amplifying transistor 303. In response to the transfer, the potential of the first common output line 2 drops by an amount of the pixel signal. A direction of the potential change corresponds to a case where electrons serve as the signal charge. When holes serve as the signal charge, the direction of the potential change is opposite.

In a fourth stage, the pulse "pts" shifts sequentially into the high level and then the low level from the low level so that the storage capacitor 10 samples and holds the potential change of the first common output line 2. Thereafter, the signal stored in the storage capacitor 10 is sequentially transferred to the second common output line 12 in accordance with the pulse "hx".

Operations executed between time T1 and time T3 during which the signal is stored in the storage capacitor 10 will now be described in detail.

After the signal is sampled and held in the storage capacitor 10 at time T1, the pulse "PSAVE" shifts into the low level from the high level at time T2 to shut off or decrease the current supplied to the operational amplifier 4 (a first step). That is, the operation mode shifts into the power saving mode from the normal operation mode. At the same time, the pulse "pr" shifts into the high level from the low level to cause the voltage VM to be supplied to the output node OUT of the operational amplifier 4 (a second step). The second step is for inhibiting the potential at the output node of the column amplifier unit 14 from approaching an off-state voltage supplied to the gate of the PMOS transistor 9a during an OFF period of the PMOS transistor 9a.

During a period between time T2 and time T3 (in the power saving mode), a gate voltage and a source voltage of the PMOS transistor 9a constituting the first switch 9 are equal to VDD and VM, respectively. A gate-source voltage VGS is calculated from VGS=VG−VS=VDD−VM and is positive. Accordingly, the off-state current is less likely to flow than when the source voltage is equal to VDD.

Thus, the voltage supply unit 8 can suppress leakage current of the PMOS transistor 9a.

On the other hand, since a gate voltage and a source voltage of the NMOS transistor 9b are equal to 0 V (GND) and VM, respectively, a gate-source voltage VGS thereof is calculated from VGS=VG−VS−VM and is negative. In this case, the off-state current is also less likely to flow than when the source voltage is equal to 0 V (GND).

Through such an operation, the off-state current of the first switch 9 including the PMOS transistor 9a can be decreased in the power saving mode. Accordingly, discharge of the signal stored in the storage capacitor 10 can be suppressed.

Although the CMOS switch serving as the first switch 9 has been described in the first exemplary embodiment, the configuration of the first switch 9 is not limited to this example. The solid-state image pickup device may include at least a controller that inhibits the potential at the output node of the column amplifier unit 14 from approaching the off-state voltage supplied to the gate of the transistor constituting the first switch 9 in the OFF state during the power saving mode. Accordingly, for example, the first switch 9 including the PMOS transistor can be adopted if the potential at the output node of the column amplifier unit 14 approaches the voltage VDD in the power saving mode because the voltage VDD is equal to or close to the off-state voltage supplied to the gate of the PMOS transistor during the OFF period of the PMOS transistor. The first switch 9 including the NMOS transistor can be also adopted if the potential at the output node of the column amplifier unit 14 approaches a ground voltage in the power saving mode because the ground voltage is equal to or close to the off-state voltage supplied to the gate of the NMOS transistor during the OFF period of the NMOS transistor. FIG. 2 illustrates the example configuration causing the potential of the output node of the column amplifier unit 14 to approach the voltage VDD in the power saving mode. An example configuration causing the potential to approach the ground voltage is illustrated in FIG. 5.

Figure 5:
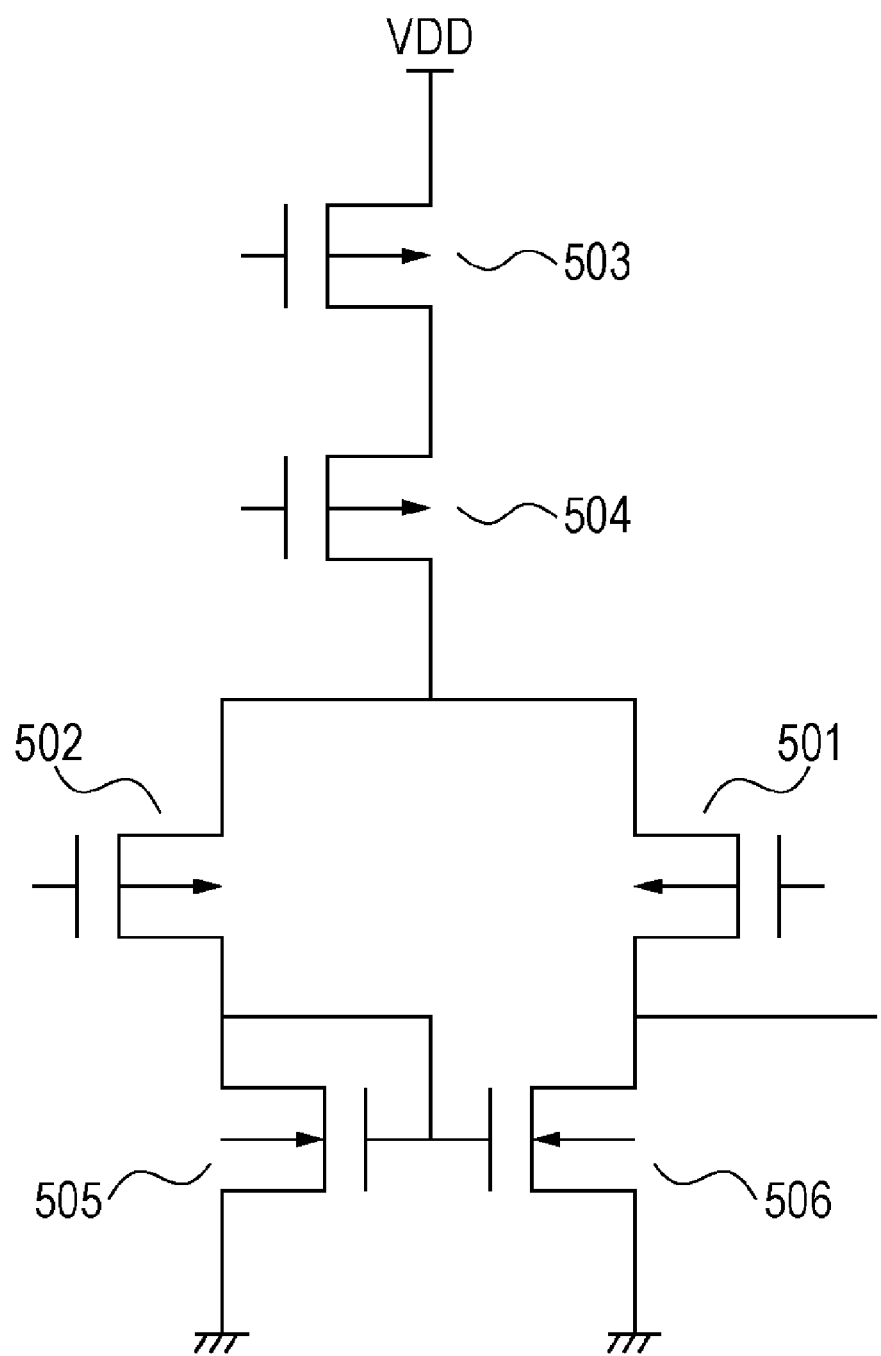
FIG. 5 is a circuit diagram illustrating another example of the operational amplifier constituting the column amplifier unit.

Referring to FIG. 5, a PMOS transistor functions as a first input transistor 501. The first input transistor 501 corresponds to the inverting input node of the operational amplifier 4. A signal is supplied to a gate of the first input transistor 501 from the first common output line 2 through the clamping capacitor 5 in the first exemplary embodiment. A PMOS transistor functions as a second input transistor 502. The second input transistor 502 corresponds to the non-inverting input node of the operational amplifier 4 and is supplied with the reference voltage Vref.

A load transistor 503 is commonly connected to sources of the first and second input transistors 501 and 502, respectively. The load transistor 503 supplies current (i.e., bias current) for causing the operational amplifier 4 to operate.

A mode switching transistor 504 can shut off the bias current to the operational amplifier 4 in accordance with a pulse supplied to a gate thereof from the mode switch 15. The mode switching transistor 504 may decrease the current compared with the normal operation mode. The mode switching transistor 504 can be arranged between the load transistor 503 and the first and second input transistors 501 and 502, respectively, in series, for example.

NMOS transistors 505 and 506 arranged on the drain side of the first and second input transistors 501 and 502, respectively, constitute a current mirror configuration. Sources of the transistors 505 and 506 are supplied with the ground potential. Since, in the power saving mode, the potential at the output node of the operational amplifier 4 is equal to the ground potential GND, polarity of the potential at the output node of the operational amplifier 4 is opposite to that of the operational amplifier 4 illustrated in FIG. 2. Accordingly, when the first switch 9 includes an NMOS transistor, the potential at the output node in the power saving mode approaches the off-state voltage supplied to the gate of the NMOS transistor during the OFF period of the NMOS transistor. However, the voltage supply unit 8 supplies a voltage for inhibiting the potential from approaching the off-state voltage, thereby being able to suppress subthreshold current and the off-state current of the NMOS transistor.

Second Exemplary Embodiment

Figure 6:
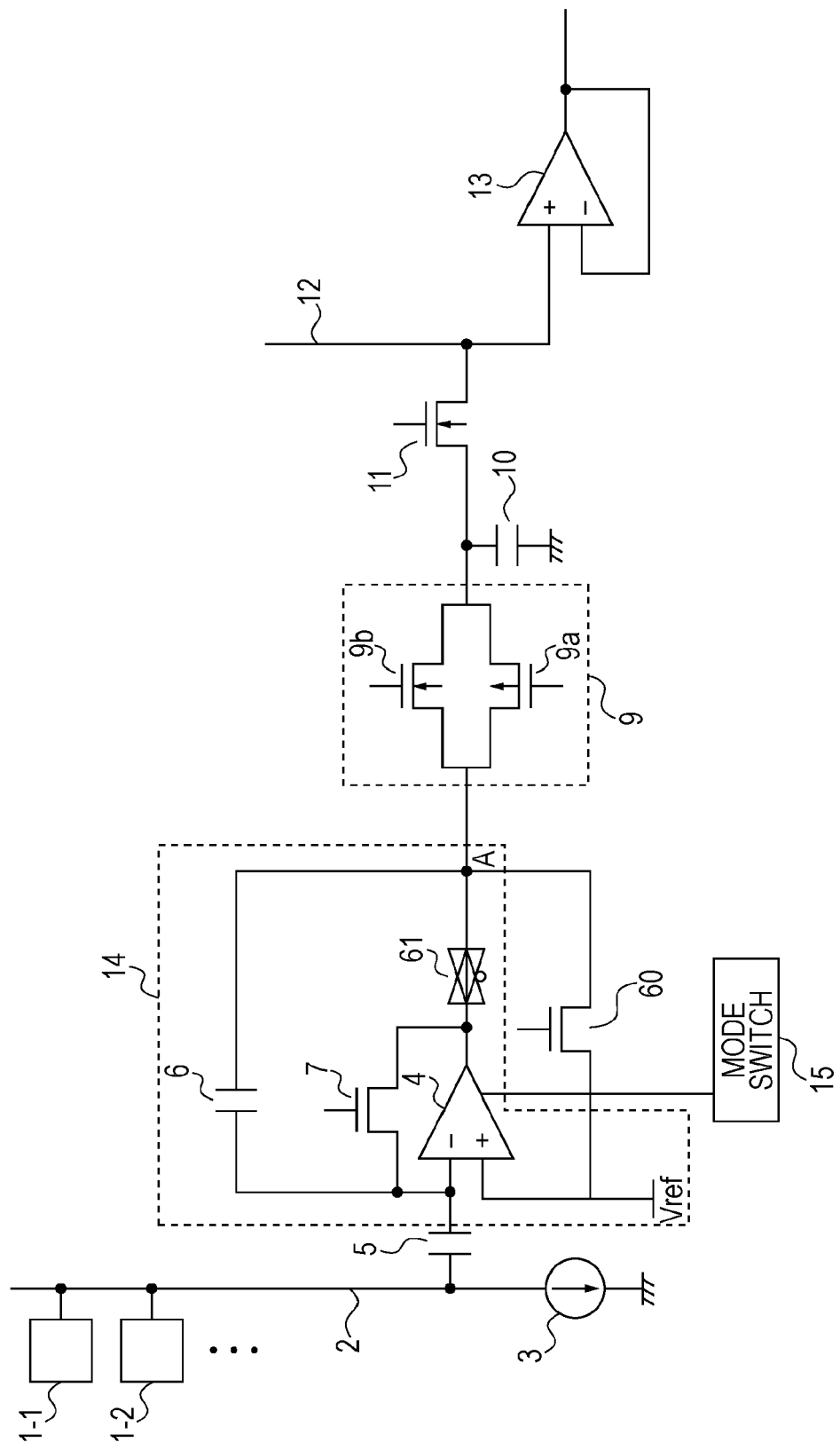
FIG. 6 is diagram illustrating an equivalent circuit of a solid-state image pickup device according to a second exemplary embodiment of the present invention.

FIG. 6 is diagram illustrating a circuit configuration of a solid-state image pickup device according to a second exemplary embodiment of the present invention.

Since parts attached with reference characters similar to those used in FIG. 1 have similar functions, a detailed description thereof is omitted. The second exemplary embodiment differs from the first one in that a switch 60 that controls electrical conduction is added between a non-inverting input node of an operational amplifier 4 supplied with a reference voltage Vref and an output node A of a column amplifier unit 14. The switch 60 serves as a controller inhibiting a potential at the output node of the column amplifier unit 14 from approaching an off-state voltage of a transistor included in a first switch 9 in a power saving mode.

Furthermore, a switch 61 is also added between a connection node of a clamping switch 7 and the output node of the operational amplifier 4 and a connection node of a feedback loop and the output node of the column amplifier unit 14.

The switch 61 includes a CMOS transistor. An NMOS transistor is supplied with an inverted signal of a control signal supplied to a PMOS transistor. One of the circuit configurations of the operational amplifier 4 illustrated in FIGS. 2 and 5 can be used. In the second exemplary embodiment, a potential relationship of GND<Vref<VDD is satisfied.

Figure 7:
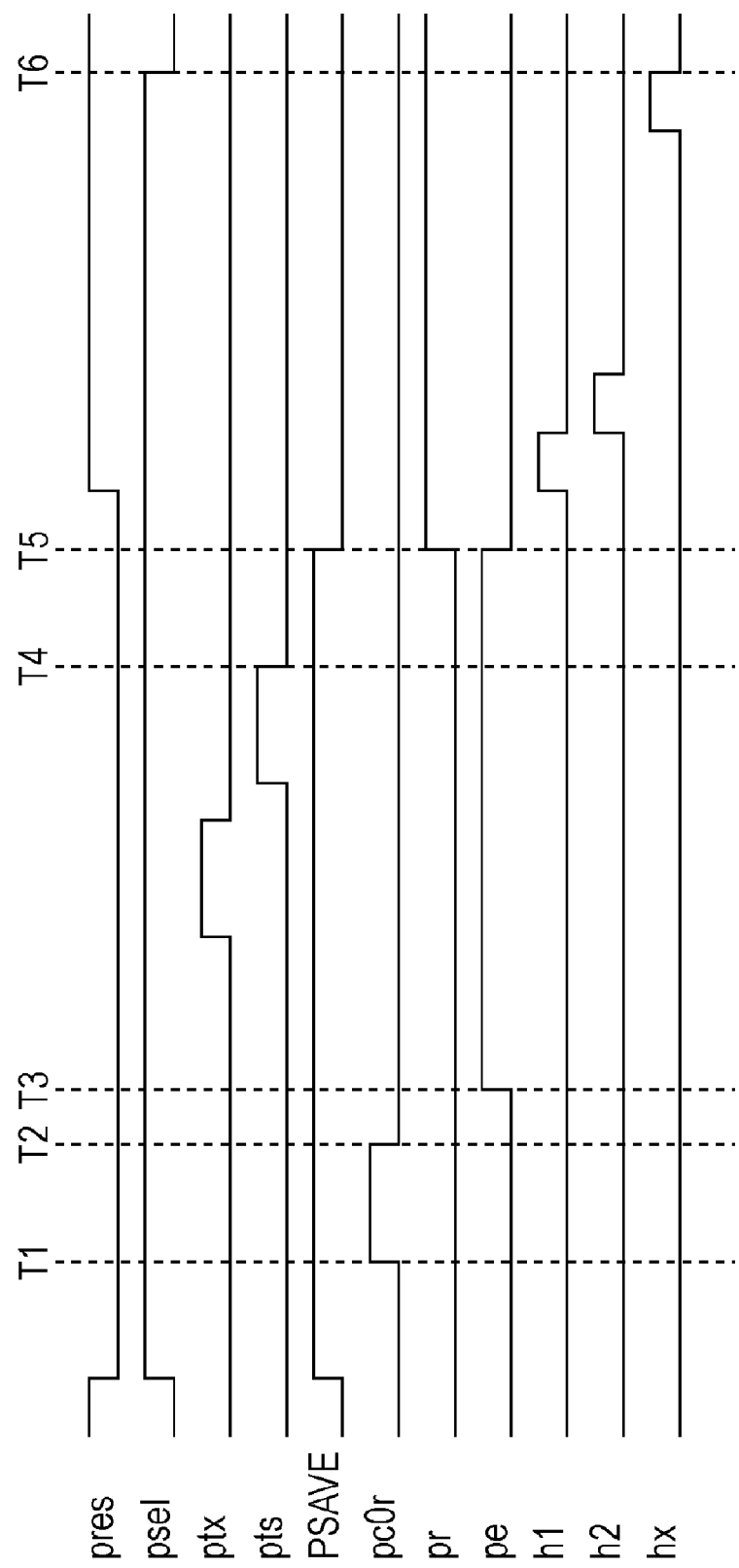
FIG. 7 is a timing chart for driving the solid-state image pickup device according to the second exemplary embodiment of the present invention.

FIG. 7 is a timing chart for driving the solid-state image pickup device illustrated in FIG. 6. A pulse "pe" is supplied to a gate of the PMOS transistor constituting the switch 61.

During a clamping operation between time T1 and time T2, a pulse is supplied that causes the switch 60 and the clamping switch 7 to be connected with the output switch 61 being turned off. At this time, a feedback capacitor 6 can sample an offset voltage of the operational amplifier 4.

At time T3, the pulse "pe" shifts into a high level from a low level to decrease the offset voltage Voff of the operational amplifier 4 to $1/(1+G)$, where G represents open loop gain of the operational amplifier 4.

In the operational amplifier 4 executing such an operation, the off-state current of the first switch 9 can be suppressed in the following manner.

During a period between time T4 and time T6 when a signal is stored in a storage capacitor 10, a pulse "PSAVE" shifts into the low level to cause the bias current to the operational amplifier 4 to be shut off or decreased (in the power saving mode). Substantially at the same time of this operation, a pulse is supplied to the gate of the switch 60 to turn on the switch 60, whereby the reference voltage Vref is supplied to the output node of the operational amplifier 4.

During a period between time T5 and time T6 (in the power saving mode), a gate voltage and a source voltage (i.e., a voltage at the output node of the column amplifier unit 14) of the PMOS transistor 9a are equal to VDD and Vref, respectively. Since a gate-source voltage VGS is calculated from VGS=VG−VS=VDD−Vref and is positive, off-state current is less likely to flow. On the other hand, a gate voltage and a source voltage (at the node A) of the NMOS transistor 9b are equal to 0 V and Vref, respectively. Since a gate-source voltage VGS is calculated from VGS=VG−VS=−Vref and is negative, the off-state current is less likely to flow. Through such an operation, the off-state current of the first switch 9 can be suppressed even in the power saving mode.

Each of the exemplary embodiments illustrates a specific example for carrying out the present invention and the technical scope of the present invention should not be limited by these exemplary embodiments. That is, the present invention can be carried out in various manners without departing from the technical spirit or major features thereof.

For example, in each exemplary embodiment, the description has been given for the operational amplifier serving as the column amplifier. A common-source amplifier circuit may be used as the column amplifier. The common-source amplifier circuit functions as an inverting amplifier circuit. When an NMOS transistor is used as an input MOS transistor of the common-source amplifier circuit, a potential at an output node thereof approaches a ground potential in the power saving mode. Accordingly, when an NMOS transistor is used as the first switch 9, the potential at the output node approaches an off-state voltage of the NMOS transistor. Thus, a controller for avoiding this state may be provided. When a PMOS transistor is used as the input MOS transistor of the common-source amplifier circuit, the opposite relation is satisfied. More specifically, when the first switch 9 includes a PMOS transistor, the potential at the output node approaches an off-state voltage of the PMOS transistor. Thus, a controller for avoiding this state may be provided.

The column amplifier may be constituted by a source follower. When an NMOS transistor is used as the input MOS transistor just like the common-source amplifier circuit and the first switch 9 includes an NMOS transistor, the potential at the output node approaches an off-state voltage of the NMOS transistor. When a PMOS transistor is used as the input MOS transistor and the first switch 9 includes a PMOS transistor, the potential at the output node approaches an off-state voltage of the PMOS transistor. Thus, a controller for avoiding this state may be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-282296 filed Dec. 11, 2009, which is hereby incorporated by reference herein in its entirety.

What is claimed is:

1. A solid-state image pickup device comprising:
a plurality of common output lines arranged to receive signals output from a plurality of pixels;
a plurality of column amplifier units provided for the respective common output lines and arranged to amplify the signals;
a plurality of storage capacitors arranged to store the amplified signals;
a first transistor, between an output node of the column amplifier unit and an input node of a storage capacitor, arranged to control electrical conduction between the output node and the input node;
a switch arranged to switch current for operating the column amplifier unit between a first current and a second current smaller than the first current; and
a controller arranged to inhibit, while the second current is flowing through the column amplifier unit, a potential at the output node from approaching an off-state voltage supplied to a gate of the first transistor in an OFF state of the first transistor.

2. The solid-state image pickup device according to claim 1, wherein
the controller includes a second transistor and a voltage supply unit, one of a source and a drain of the second transistor being connected to the output node, and the voltage supply unit supplying a voltage different from the off-state voltage to the other one of the source and the drain of the second transistor.

3. The solid-state image pickup device according to claim 2, wherein
a column amplifier unit includes an operational amplifier, and wherein
the second transistor controls electrical conduction between the output node and a non-inverting input node of the operational amplifier.

4. The solid-state image pickup device according to claim 1, wherein
a common-source amplifier circuit serves as a column amplifier unit.

5. The solid-state image pickup device according to claim 1, wherein
a CMOS transistor serves as the first transistor controlling electrical conduction between the output node and the input node.

6. A method for driving a solid-state image pickup device, the solid-state image pickup device including:
a plurality of common output lines arranged to receive signals output from a plurality of pixels;
a plurality of column amplifier units provided for the respective common output lines and arranged to amplify the signals;
a plurality of storage capacitors arranged to store the amplified signals; and
a first transistor, between an output node of the column amplifier unit and an input node of a storage capacitor, arranged to control electrical conduction between the output node and the input node, the method for driving the solid-state image pickup device comprising the steps of:
switching current for operating the column amplifier units between a first current and a second current smaller than the first current; and
inhibiting, by a controller, while the second current is flowing through the column amplifier unit, a potential at the output node from approaching an off-state voltage supplied to a gate of the first transistor in an OFF state of the first transistor.

7. The method according to claim 6, wherein
the controller includes a second transistor and a voltage supply unit, one of a source and a drain of the second transistor being connected to the output node, and the voltage supply unit supplying a voltage different from the off-state voltage to the other one of the source and the drain of the second transistor.

8. The method according to claim 7, wherein
a column amplifier unit includes an operational amplifier, and wherein
the second transistor controls electrical conduction between the output node and a non-inverting input node of the operational amplifier.

9. The method according to claim 6, wherein
a common-source amplifier circuit serves as a column amplifier unit.

10. The method according to claim 6, wherein
a CMOS transistor serves as the first transistor controlling electrical conduction between the output node and the input node.

* * * * *